US 8,709,591 B2

(12) United States Patent
Sumi et al.

(10) Patent No.: US 8,709,591 B2
(45) Date of Patent: Apr. 29, 2014

(54) RESIN COMPOSITION AND MOLDED ARTICLE

(75) Inventors: Saori Sumi, Shiga (JP); Kazuyoshi Nishikawa, Shiga (JP); Masahiro Kimura, Shiga (JP); Sadanori Kumazawa, Aichi (JP)

(73) Assignee: Toray Industries, Inc. (JP)

( * ) Notice: Subject to any disclaimer, the term of this patent is extended or adjusted under 35 U.S.C. 154(b) by 1149 days.

(21) Appl. No.: 12/513,930

(22) PCT Filed: Dec. 27, 2007

(86) PCT No.: PCT/JP2007/075080
§ 371 (c)(1),
(2), (4) Date: May 7, 2009

(87) PCT Pub. No.: WO2008/078802
PCT Pub. Date: Jul. 3, 2008

(65) Prior Publication Data
US 2010/0003882 A1  Jan. 7, 2010

(30) Foreign Application Priority Data

Dec. 27, 2006 (JP) ................................ 2006-351135
Dec. 27, 2006 (JP) ................................ 2006-351136

(51) Int. Cl.
*B32B 5/16* (2006.01)
*C08F 8/00* (2006.01)
*C08G 63/08* (2006.01)

(52) U.S. Cl.
USPC ........... 428/327; 428/323; 428/338; 428/339; 428/98; 525/190; 525/191; 525/450; 525/221; 525/240

(58) Field of Classification Search
USPC .................................. 525/64, 190
See application file for complete search history.

(56) References Cited

U.S. PATENT DOCUMENTS

| 8,137,773 B2* | 3/2012 | Hiruma et al. ............... 428/34.9 |
| 2007/0160861 A1 | 7/2007 | Shinoda et al. |
| 2007/0173603 A1* | 7/2007 | Murakami et al. ............. 525/63 |
| 2009/0023861 A1* | 1/2009 | Shimakage et al. ........... 525/89 |
| 2011/0262683 A1* | 10/2011 | Mochizuki et al. ............. 428/97 |

FOREIGN PATENT DOCUMENTS

| EP | 1 550 746 A1 | 7/2005 |
| EP | 1 719 803 A1 | 11/2006 |
| JP | 5-179110 A | 7/1993 |
| JP | 6-263892 A | 9/1994 |
| JP | 2003-301077 A | 10/2003 |
| JP | 2005-068232 A | 3/2005 |
| JP | 2005-248160 A | 9/2005 |
| JP | 2005-307128 A | 11/2005 |
| JP | 2005307128 | * 11/2005 |
| JP | 2006-077063 A | 3/2006 |
| JP | 2006-241445 A | 9/2006 |
| JP | 2006241445 | * 9/2006 |
| JP | 2006-321988 A | 11/2006 |
| JP | 2007-277444 A | 10/2007 |
| JP | 2007-308638 A | 11/2007 |
| WO | 2005/078017 A1 | 8/2005 |
| WO | WO 2007063973 | * 6/2007 |

OTHER PUBLICATIONS

Kraton polymers flyer, 2000.*

* cited by examiner

*Primary Examiner* — Irina Krylova
(74) *Attorney, Agent, or Firm* — DLA Piper LLP (US)

(57) ABSTRACT

A resin composition includes a biodegradable resin (A), a polyolefin resin (B) and a dispersing agent (C), which has a sea-isle structure in which the biodegradable resin (A) is dispersed as isles in the polyolefin resin (B) existing as a sea component wherein the average dispersed particle size of the biodegradable resin (A) is 1 nm to 1000 nm.

5 Claims, No Drawings

RESIN COMPOSITION AND MOLDED ARTICLE

RELATED APPLICATIONS

This is a §371 of International Application No. PCT/JP2007/075080, with an international filing date of Dec. 27, 2007 (WO 2008/078802 A1, published Jul. 3, 2008), which is based on Japanese Patent Application Nos. 2006-351135, filed Dec. 27, 2006, and 2006-351136, filed Dec. 27, 2006.

TECHNICAL FIELD

This disclosure relates to a resin composition and a molded article respectively containing a biodegradable resin.

BACKGROUND

Polyolefin resins typified by polypropylene are used for diverse applications since they are inexpensive, excellent in moldability and also excellent in the balance of physical properties such as stiffness. For application as molded resin articles, the resins are used as automobile members and containers owing to the mechanical properties of the resins. For application as films, the resins are used as packaging films for foods such as confectionery owing to the moisture resistance and moisture-proof property thereof. Further, for application as fibers, nonwoven fabrics formed of the resins are popularly used as sanitary materials such as disposable diapers.

However, since petroleum-derived materials have such problems as the depletion of oil resource, the generation of carbon dioxide at the times of production and incineration disposal, and non-degradability as waste. So, in recent years, biodegradable resins and organism-derived materials attract attention.

Among biodegradable resins, especially polylactic acid resins mainly composed of lactic acid monomer are expected as biopolymers that can substitute the resins produced from fossil raw materials such as petroleum for such reasons that lactic acid monomer can be produced at low cost with the biomass of corns or the like as a raw material by fermentation methods using microbes and that the melting point is as high as about 170° C. to allow melt molding.

However, polylactic acid resins are unsuitable for use as molded articles via crystallization, since they are low in crystallization rate. For example, in the case where polylactic acid resins are injection-molded, there are such large problems concerned with moldability and heat resistance to be addressed for practical application that the molding cycle time is too long, that heat treatment is necessary after molding, and that deformation at the times of molding, and heat treatment is large.

On the other hand, techniques of mixing multiple resins are widely known as polymer alloy techniques and are widely used for the purpose of improving the disadvantages of individual polymers.

JP 05-179110 A discloses a microbially degradable thermoplastic resin composition, in which polyolefin resins are mixed and dispersed in a microbially decomposable thermoplastic resin, one of the polyolefin resins being a modified polyolefin resin. However, JP 05-179110 A is intended to control the microbial degradability, and does not suggest at all any solving means for obtaining a resin composition excellent in all the properties of moldability, impact resistance, heat resistance and the like.

JP 06-263892 A discloses a microbially degradable thermoplastic resin film formed of a composition, in which a compatibilizing agent is mixed with a mixture consisting of an aliphatic polyester and a polyolefin resin. However, though the film of JP 06-263892 A has high microbial degradability and thermal fusion bondability since the sea component is an aliphatic polyester, the patent document does not suggest at all any solving means for obtaining a resin composition excellent in all the properties of moldability, impact resistance, heat resistance and the like.

JP 2003-301077 A discloses a polyolefin resin composition containing a polyolefin resin, polylactic acid-based synthetic resin component, vinyl acetate/ethylene copolymer and the like. However, JP 2003-301077 A is intended for stable productivity in the processing for forming a sheet-like material, and does not disclose anything about heat-resistance at all. The document does not suggest at all any solving means for obtaining a resin composition excellent in all the properties of moldability, impact resistance, heat resistance and the like.

JP 2005-68232 A discloses a biodegradable blend resin obtained by blending a biodegradable resin and a polyolefin resin. However JP 2005-68232 A is intended to obtain a laminate film with a high interlayer adhesive strength, and does not suggest at all any solving means for obtaining a resin composition excellent in all the properties of moldability, impact resistance, heat resistance and the like.

JP 2005-248160 A discloses a biodegradable plastic material obtained by mixing a biodegradable polymer, a polymer other than a biodegradable polymer and a compatibilizing agent. However, JP 2005-248160 A is insufficient in the effect of enhancing heat resistance, and does not suggest at all any solving means for obtaining a resin composition excellent in all the properties of moldability, impact resistance, heat resistance and the like.

JP 2005-307128 A discloses a polylactic acid resin composition containing a polylactic acid resin, modified polypropylene resin and inorganic filler. However, though JP 2005-307128 A has an effect of enhancing heat resistance to some extent, the disclosure is not sufficient yet and does not suggest at all any solving means for obtaining a resin composition excellent in all the properties of moldability, impact resistance, heat resistance and the like.

As described above, even if any of the above-mentioned methods is used, it is very difficult to obtain a resin composition satisfying all the properties of moldability, impact resistance, heat resistance and the like. There are many demands for materials that can be used without any practical problem, and it is desired to further improve the presently available materials.

It could therefore be helpful to provide a molded article that contains a biodegradable resin low in environmental load such as polylactic acid, has productivity equivalent to that of presently available molded polyolefin articles and also has moisture-proof property, dimensional stability and the like equivalent to those of presently available articles.

SUMMARY

We thus provide a resin composition comprising a biodegradable resin (A), a polyolefin resin (B) and a dispersing agent (C), which has a sea-isle structure in which the biodegradable resin (A) is dispersed as isles in the polyolefin resin (B) existing as a sea component, wherein the average dispersed particle size of the biodegradable resin (A) is 1 nm to 1000 nm.

Further, we provide a molded article containing the above-mentioned resin composition. In this case, the molded article includes a film and fibers.

The resin composition is excellent in moldability and can be processed into a molded article excellent in impact resistance, heat resistance, mechanical properties, moisture-proof property and the like. The resin composition can be suitably used as films for general industry and packaging materials, nonwoven fabrics for foods, sanitary materials and industrial materials and the like.

DETAILED DESCRIPTION

In the resin composition, it is important that the phase consisting of the biodegradable resin (A) and the phase consisting of the polyolefin (B) are incompatible with each other in such a manner as to form a sea-isle structure in which isles consisting of the biodegradable resin (A) are dispersed in the sea consisting of the polyolefin resin (B). It is considered that in this sea-isle structure, the crystallization of the polyolefin resin (B) is promoted in the interfaces between the phase of the biodegradable resin (A) and the phase of the polyolefin resin (B) and that the interface portions act as crystal growth nuclei to enhance the crystallinity of the phase of the polyolefin resin (B) as a whole. Further, it is important that the average dispersed particle size of the phase of the biodegradable resin (A) is 1 nm to 1000 nm. A preferred range is 10 nm to 900 nm, and a more preferred range is 50 to 700 nm. In the case where the average dispersed particle size is in this range, the area of the interfaces between the phase of the biodegradable resin (A) and the phase of the polyolefin resin (B) becomes large, to increase the effect of enhancing the crystallinity in the phase of the polyolefin resin (B) and also to improve the transparency of the resin formed as a molded article. On the other hand, if the average dispersed particle size of the biodegradable resin (A) is larger than 1000 nm, the above-mentioned effect of enhancing crystallinity declines to lower the transparency of the molded article and also to lower the stable productivity in the molding process. Furthermore, if the average dispersed particle size of the biodegradable resin (A) is smaller than 1 nm, the above-mentioned effect of enhancing crystallinity becomes so large as to cause lower moldability, cracking, poor hand and the like.

Meanwhile, to confirm the phase structure of the resin composition, an ultrathin section specimen is prepared using a microtome in such a manner that a cross section of a pallet becomes the sample surface, and the cross section of the ultrathin section specimen is photographed using a transmission electron microscope for confirmation. Among the isles of the biodegradable resin (A) observed in the photograph, the minor axis lengths of arbitrarily selected 10 isles are measured and averaged to obtain the average dispersed particle size. In the case where the phase structure of a film obtained by molding the resin composition is confirmed, the film is embedded in an epoxy resin, and ultrathin section specimens are prepared using a microscope for observing the cross sections in the machine direction and thickness direction of the film. As described above, a transmission electron microscope is used for confirmation. In the case where the phase structure of a fiber obtained by molding the resin composition is confirmed, the fiber is embedded in an epoxy resin and an ultrathin section specimen is prepared using a microtome for observing the cross section perpendicular to the spinning direction. As described above, a transmission electron microscope is used for confirmation.

On the other hand, in the case where a resin composition consisting of a biodegradable resin (A) only is molded or in the case where a resin composition with a sea-isle structure in which isles of the polyolefin resin, (B) are dispersed in the sea of the biodegradable resin (A) is molded, there are such problems that if the molded article is an injection-molded article, the toughness is too low, that if the molded article is a film, the water vapor barrier property is insufficient, and that if the molded article is fibers, the productivity is too low.

As the biodegradable resin (A), enumerated are aliphatic polyesters, copolymers consisting of aliphatic polyesters and aromatic polyesters, polyvinyl alcohol and the like. Examples of the aliphatic polyesters include polylactic acid, polyglycolic acid, poly-3-hydroxybutylate, poly-3-hydroxybutylate-3-hydroxyvalelate, polycaprolactone, and aliphatic polyesters consisting of aliphatic diols such as ethylene glycol and 1,4-butanediol and aliphatic dicarboxylic acids such as succinic acid and adipic acid. Examples of the copolymers consisting of aliphatic polyesters and aromatic polyesters include polybutylene succinate-terephthalate, polybutylene, adipate-terephthalate and the like.

Among them, a polylactic acid resin can be used most suitably. The polylactic acid resin is a polymer with lactic acid as a main component, but can also contain a copolymer component other than lactic acid. In this case, lactic acid being a main component means that the content of lactic acid units is 70 to 100 mol % with the amount of all the monomer units as 100 mol %. A preferred range is 90 to 100 mol %. Examples of the other copolymer component units include polyvalent carboxylic acids, polyhydric alcohols, hydroxycarboxylic acids, lactones and the like. Particular examples of the polyvalent carboxylic acids include adipic acid, sebacic acid, dodecanedioic acid, fumaric acid, cyclohexanedicarboxylic acid, terephthalic acid, isophthalic acid and the like. Examples of the polyhydric alcohols include ethylene glycol, propylene glycol, butanediol, 1,4-cyclohexanedimethanol, neopentyl glycol glycerol, diethylene glycol, triethylene glycol, polyethylene glycol and the like. Examples of the hydroxycarboxylic acids include glycolic acid, 3-hydroxybutyric acid, 4-hydroxybutyric acid, 4-hydroxyvaleric acid, 6-hydroxycaproic acid, hydroxybenzoic acid and the like. Examples of the lactones include glycollide, $\epsilon$caprolactone glycollide, $\epsilon$-caprolactone, $\beta$-propiolactone, $\delta$-butyrolactone and the like. It is preferred that the amount of the copolymer component units is 0 to 30 mol % per 100 mol % of all the monomer units. A more preferred range is 0 to 10 mol %.

In the case where the resin composition is used for any application requiring heat resistance, it is preferred to use a polylactic acid resin high in the optical purity of lactic acid component as the biodegradable resin (A). That is, among all the lactic acid units of the polylactic acid resin, it is preferred that the L-form accounts for 80% or more or that the D-form accounts for 80% or more. It is more preferred that the L-form accounts for 90% or more or that the D-form accounts for 90% or more, and it is especially preferred that the L-form accounts for 95% or more or that the D-form accounts for 95% or more. It is most preferred that the L-form accounts for 98% or more or that the D-form accounts for 98% or more. The upper limit of the content of the L-form or D-form is 100%.

Further, in the case where the resin composition is used for any application requiring heat resistance, it is preferred to use poly(lactic acid) stereocomplex as the biodegradable resin (A). The method for forming poly(lactic acid) stereocomplex can be, for example, a method in which poly-L-lactic acid and poly-D-lactic acid respectively with high optical purity are mixed using a technique such as melt kneading or solution mixing. It is preferred for more efficiently forming a stereocomplex that the optical purity of the poly-L-lactic acid and poly-D-lactic acid used is 90% or more. More preferred is 95% or more, and further more preferred is 98% or more. Further, as another method, a method of using a block copolymer consisting of a poly-L-lactic acid segment and a poly-D-lactic acid segment can also be employed. Since poly(lactic acid) stereocomplex can be easily formed, the method of using a block copolymer consisting of a poly-L-lactic acid segment and a poly-D-lactic acid segment is preferred. Furthermore, the poly(lactic acid) stereocomplex can be used alone or poly(lactic acid) stereocomplex and poly-L-lactic acid or poly-D-lactic acid can also be used together.

As the method for producing a polylactic acid resin, a publicly known polymerization method such as a method of directly polymerizing lactic acid or a ring-opening polymerization method via lactide can be used.

In the case where a polylactic acid resin is used, the molecular weight and the molecular weight distribution are not especially limited if extrusion molding is possible. However, it is preferred that the weight average molecular weight is 10000 to 500000. A more preferred range is 40000 to 300000, and a further more preferred range is 80000 to 250000. The average molecular weight in this case is the molecular weight as polymethyl methacrylate measured by gel permeation chromatography. If the weight average molecular weight is less than 10000, the molded article becomes fragile and may not be suitable for practical use as the case may be. If the weight average molecular weight is more 500000, the melt viscosity is so high that extrusion is often difficult and the molded article may become rough on the surface as the case may be.

The melting point of the polylactic acid resin is not especially limited, but is preferably 120° C. or higher, more preferably 150° C. or higher.

The polyolefin resin (B) is a non-modified olefin resin obtained by polymerizing or copolymerizing an olefin such as ethylene or propylene or an olefin alcohol such as vinyl alcohol, and does not include a modified polyolefin resin modified by such a compound as an unsaturated carboxylic acid or a derivative thereof or a carboxylic acid vinyl ester.

Particular examples include homopolymers such as polyethylene resin, polypropylene resin, poly-1-butene resin, poly-1-pentene resin and poly-4-methyl-1-pentene resin, ethylene/α-olefin copolymers and copolymers obtained by copolymerizing one or more of non-conjugated diene monomers such as 1,4-hexadiene, dicyclopentadiene, 2,5-norbornadiene, 5-ethylidene norbornene, 5-ethyl-2,5-norbornadiene, 5-(1'-propenyl)-2-norbornene and the like with the foregoing.

The ethylene/α-olefin copolymer is a copolymer obtained from ethylene and at least one or more α-olefins with 3 or more carbon atoms, preferably 3 to 20 carbon atoms. Examples of the α-olefins with 3 to 20 carbon atoms include propylene, 1-butene, 1-pentene, 1-hexene, 1-heptene, 1-octene, 1-nonene, 1-decene, 1-undecene, 1-dodecene and the like. Among these α-olefins, it is preferred to use an α-olefin with 3 to 12 carbon atoms for obtaining the copolymer in view of higher mechanical strength. It is preferred that the α-olefin content of the ethylene/α-olefin copolymer is 1 to 30 mol %. A more preferred range is 2 to 25 mol %, and a further more preferred range is 3 to 20 mol %.

To control sea-isle structure and higher crystallinity, a resin selected from polyethylene resin, polypropylene resin and ethylene/propylene copolymer resin is preferred. In view of crystallinity, polypropylene resin is more preferred, and in view of toughness polyethylene resin is more preferred.

Any one of the above-mentioned polyolefin resins can be used alone or at least two or more of them can also be used together to such an extent that the selected effect is not impaired.

The method for producing the polyolefin resin is not especially limited, and a publicly known method can be used. For example, to produce the polyolefin resin, any of radical polymerization, coordination polymerization using a Ziegler-Natta catalyst, anion polymerization, coordination polymerization using a metallocene catalyst and the like can be used.

In the case where the polyolefin resin (B) is a polypropylene resin, it is preferred to use a polypropylene resin with high stereospecificity. If a polypropylene resin with high isotacticity is used, a resin composition excellent in moldability and crystallinity can be obtained. On the other hand, if a polypropylene resin with high syndiotacticity is used, a resin composition excellent in impact resistance and transparency can be obtained. As stereospecificity, it is preferred that isotacticity or syndiotaticity is 80% or more. More preferred is 90% or more, and further more preferred is 95% or more. As the syndiotacticity in this case, in $^{13}$C-NMR measurement using deuterated o-dichlorobenzene as the solvent at 110° C., with the total of the integrated intensities of the peaks of straight chain or branched methyl groups at 20.2 ppm, 20.8 ppm and 21.5 ppm, respectively observed as syndiotacticity, heterotacticity and isotacticity as 100%, the rates of the integrated intensities of the respective peaks are calculated and expressed in percentage.

Further, polypropylene resins different in stereospecificity can also be used together. For example, it is preferred to use two or more polypropylene resins with isotacticity as the main structure, since a resin composition excellent in flowability, moldability and crystallinity is likely to be easily obtained. It is preferred to use one or more polypropylene resins with high isotacticity and one or more polypropylene resins with high syndiotacticity, since a resin composition excellent in moldability, crystallinity and impact resistance is likely to be easily obtained.

A polypropylene resin with high isotacticity is likely to be easily obtained by coordination polymerization using a Ziegler-Natta catalyst, and a polypropylene resin with high syndiotacticity is likely to be easily obtained by coordination polymerization using a metallocene, catalyst.

In the case where the polyolefin resin (B) is a polypropylene resin, it is preferred that the melt flow rate (MFR) measured according to JIS K 7210 is 1 to 100 g/10 min, since the capability to form the sea-isle structure with the biodegradable resin (A), crystallinity, moldability and the like are excellent. A more preferred range is 2 to 80 g/10 min, and a further more preferred range is 4 to 60 g/10 min. If MFR is lower than 1 g/10 min, the melt viscosity is so high that not only the extrusion capability but also the dispersibility of the biodegradable resin (A) declines. Further, if MFR is higher than 100 g/10 min, the molded article obtained declines in mechanical properties.

As the dispersing agent (C), at least one selected from the following can be preferably used:

(C-1) Ethylene/vinyl acetate copolymer (C-2) Ethylene/acrylic acid ester copolymers and ethylene/methacrylic acid ester copolymers (C-3) Polyolefin resins containing at least one type of functional groups selected from the group consisting of acid anhydride groups, carboxyl groups, amino groups, imino groups, alkoxysilyl groups, silanol groups, silyl ether groups, hydroxyl groups and epoxy groups (C-4) Acrylic resin or styrene resin containing at least one type of functional group selected from the group consisting of acid anhydride groups, carboxyl groups, amino groups, imino groups, alkoxysilyl groups, silanol groups, silyl ether groups, hydroxyl groups and epoxy groups.

(C-5) Polyolefin-polystyrene block copolymers containing at least one type of functional groups selected from the group consisting of acid anhydride groups, carboxyl groups, amino groups, imino groups, alkoxysilyl groups, silanol groups, silyl ether groups, hydroxyl groups and epoxy groups.

In view of the dispersibility of the biodegradable resin (A), it is preferred that the dispersing agent (C-1) has a vinyl acetate content of 25 mass % to less than 55 mass %, A more preferred vinyl acetate content range is 28 mass % to 50 mass %. A further more preferred range is 30 mass % to 45 mass %, and an especially preferred range is 34 mass % to 41 mass %. In this case, the vinyl acetate content is measured according to JIS K 7192.

In view of moldability it is preferred that the melt flow rate (MFR) of the dispersing agent (C-1) at 190° C. and a load of 21.2 N is 30 g/10 min or less. A more preferred MFR range is 1 to 20 g/10 min, and a further more preferred range is 2 to 10 g/10 min. In this case, the melt flow rate is measured according to JIS K 7210.

Meanwhile, an ethylene/vinyl acetate copolymer containing an acid or epoxy groups is not included in the (C-1) ethylene/vinyl acetate copolymer, but is included in the (C-3) acid- or epoxy group-containing polyolefin resin described later.

Commercially available products of the dispersing agent (C-1) include "Evaflex (registered trademark)" produced by Du Pont-Mitsui Polychemicals Co., Ltd, "Levapren (registered trademark)" produced by Lanxess, "Evatate (registered trademark)" produced by Sumitomo Chemical Co., Ltd., "Utracene (registered trademark)" produced by Tosoh Corporation, "Novatec (registered trademark)" EVA produced by Japan Polyethylene Corporation, "NUC (registered trademark) EVA copolymer" produced by Nippon Unicar Co., Ltd., etc.

In view of the dispersibility of the biodegradable resin (A), it is preferred that the dispersing agent (C-2) contains 25 mass % or more of an acrylic acid ester or methacrylic acid ester. Hereinafter, an acrylic acid ester or methacrylic acid ester is referred to as a (meth)acrylic acid ester. It is more preferred that the ethylene/(meth)acrylic acid ester content is 30 mass % or more, and a further more preferred range is 30 mass % to 50 mass %. In this case, the (meth)acrylic acid ester content is obtained by measuring the FT-IR spectra of ethylene/(meth)acrylic acid ester copolymers with known respective (meth)acrylic acid ester contents, to prepare a calibration curve of the respective contents, measuring the FT-IR spectrum of the dispersing agent (C-2), and finding the content corresponding to the FT-IR spectrum from the calibration curve.

In view of moldability, it is preferred that the melt flow rate (MFR) of the dispersing agent (C-2) at 190° C. and a load of 21.2N is 8 g/10 min or more. A more preferred range is 10 to 1000 g/10 min, and a further more preferred range is 30 to 500 g/10 min. In this case, the melt flow rate (MFR) is measured according to JIS K 7210.

Meanwhile, an ethylene/(meth)acrylic acid ester copolymer containing at least one type of functional groups selected from acid anhydride groups, carboxyl groups, amino groups, imino groups, alkoxysilyl groups, silanol groups, silyl ether groups, hydroxyl groups and epoxy groups is not included in the dispersing agent (C-2), but is included in the dispersing agent (C-3).

Commercially available products, of the dispersing agent (C-2) include "LOTRYL (registered trademark)" produced by Arkema, "Evaflex (registered trademark) EEA" produced by Du Pont-Mitsui Polychemicals Co., Ltd., "Acryft (registered trademark)" produced by Sumitomo Chemical Co., Ltd., "NUC (registered trademark,) EEA copolymer" produced by Nippon Unicar Co., Ltd., etc.

In view of the dispersibility of the biodegradable resin (A), it is preferred that the dispersing agent (C-3) contains 3 to 45 mass % of vinyl acetate or (meth)acrylic acid ester. It is more preferred that the vinyl acetate content or (meth)acrylic acid ester content is 15 wt % to 40 wt %. A further more preferred range is 25 wt % to 40 wt %, and an especially preferred range is 30 wt % to 40 wt %. In this case, the vinyl acetated content is measured according to JIS K 7192. The (meth)acrylic acid ester content is obtained by measuring the FT-IR spectra of acid- or epoxy group-containing polyolefin resins with known respective (meth)acrylic acid ester contents, to prepare a calibration curve of the respective contents, measuring the FT-IR spectrum of the dispersing agent (C-3), and finding the content corresponding to the FT-IR spectrum from the calibration curve.

In view of the dispersibility of the biodegradable resin (A), it is preferred that the melt flow rate (MFR) of the dispersing agent (C-3) at 190° C. and a load of 21.2N is 1 g/10 min or more. A more preferred MFR range is 1 to 300 g/10 min, and a further more preferred range is 2 to 50 g/10 min. An especially preferred range is 5 to 30 g/10 min. In this case, the melt flow rate (MFR) is measured according to JIS K 7210.

Meanwhile, as the dispersing agent (C-3), in view of the dispersibility of the biodegradable resin (A), a polyolefin resin containing at least one type of functional groups selected from acid anhydride groups, amino groups, imino groups and epoxy groups is preferred, and a polyolefin resin containing at last one type of functional groups selected from acid anhydride groups and epoxy groups is more preferred.

Commercially available products of the dispersing agent (C-3) include "Bondfast (registered trademark)" produced by Sumitomo Chemical Co., Ltd., "Rexpearl (registered trademark)" produced by Japan Polyethylene Corporation, "Toughmer (registered trademark)" produced by Mitsui Chemicals, Inc., "Admer (registered trademark)" produced by Mitsui Chemicals, Inc., "Modiper (registered trademark)" produced by NOF Corporation, "Youmex (registered trademark)" produced by Sanyo Chemical Industries, Ltd., "OREVAC" produced by Arkema, "LOTADER" produced by Arkema, "BONDINE" produced by Arkema, "EVADYNE" produced by Arkema, "Nucrel (registered trademark)" produced by Du Pont-Mitsui Polychemicals Co., Ltd., "Primacor (registered trademark)" produced by Dow Chemical Company, etc.

As the dispersing agent (C-4), in view of the dispersibility of the biodegradable resin (A), an acrylic resin or styrene resin containing at least one type of functional groups selected from acid anhydride groups, amino groups, imino groups and epoxy groups is preferred, and an acrylic resin or styrene resin containing at least one type of functional groups selected from acid anhydride groups and epoxy groups is more preferred. An epoxy group-containing acrylic resin or styrene resin is especially preferred. Further, it is preferred that the weight average molecular weight of the dispersing agent (C-4) is 1000 to 300000. In this case, the weight average molecular weight is a weight average molecular weight as polymethyl methacrylate (PMMA) measured by gel permeation chromatography (GPC) using hexafluoroisopropanol as the solvent.

The dispersing agent (C-4) contains (meth)acrylic acid ester-based vinyl units or styrene-based vinyl units. It is preferred that the dispersing agent (C-4) contains 60 mass % or more of (meth)acrylic acid ester-based vinyl units or styrene-based vinyl units. More preferred is 80 mass % or more. The dispersing agent (C-4) can also be a copolymer obtained by copolymerizing preferably 40 mass % or less, more preferably 20 mass % or less of other vinyl monomer component units.

Further, in the case where the dispersing agent (C-4) is a styrene resin containing functional groups, it is preferred in view of the dispersibility of the biodegradable resin (A) that the content of the styrene-based vinyl units is 1 to 30 mass %. A more preferred range is 5 to 15 mass %. In this case, the amount of vinyl units (mass %) is obtained by measuring the spectrum by solution proton nuclear magnetic resonance ($^1$H-NMR) and calculating from the composition ratio obtained from the integrated intensities of respective peaks.

As the raw monomer for forming the (meth)acrylic acid ester-based vinyl units, in view of moldability, preferred are methyl acrylate, methyl methacrylate, ethyl acrylate, ethyl methacrylate, propyl acrylate, propyl methacrylate, n-butyl acrylate, n-butyl methacrylate, isobutyl acrylate, isobutyl methacrylate, t-butyl acrylate, t-butyl methacrylate, 2-ethylhexyl acrylate, 2-ethylhexyl methacrylate, cyclohexyl acrylate, cyclohexyl methacrylate, isobornyl acrylate, isobornyl methacrylate, acrylonitrile, methacrylonitrile and the like. Among them, methyl acrylate, methyl methacrylate, ethyl acrylate, ethyl methacrylate, n-butyl acrylate, n-butyl methacrylate, 2-ethylhexyl acrylate, 2-ethylhexyl methacrylate, acrylonitrile and methacrylonitrile are more preferred. In view of heat resistance, methyl methacrylate is most preferred. Any one of them can be used alone or two or more of them can be used.

As the raw monomer for forming the styrene-based vinyl units, particularly preferably used are styrene, α-methylstyrene, p-methylstyrene, α-methyl-p-methylstyrene, p-methoxystyrene, o-methoxystyrene, 2,4-dimethylstyrene, 1-vinylnaphthalene, chlorostyrene, bromostyrene, divinylbenzene, vinyltoluene and the like. Among them, styrene and α-methylstyrene can be preferably used. Any one of them can be used alone or two or more of them can be used.

As the raw monomer for forming the epoxy group-containing vinyl units, particularly preferably enumerated are glycidyl esters of unsaturated monocarboxylic acids such as glycidyl (meth)acrylate and glycidyl p-styrylcarboxylate, monoglycidyl esters or polyglycidyl esters of unsaturated polycarboxylic acids such as maleic acid and itaconic acid, unsaturated glycidyl ethers such as allyl glycidyl ether, 2-methylallyl glycidyl ether and styrene-4-glycidyl ether. Among them, in view of radical polymerizability, glycidyl acrylate and glycidyl methacrylate can be preferably used. Any one of them can be used alone or two or more of them can be used.

As the raw monomer for forming the acid anhydride group-containing vinyl units, particularly maleic anhydride, itaconic anhydride, citraconic anhydride, aconitic anhydride and the like can be enumerated. Among them, maleic anhydride can be preferably used. Any one of them can be used alone or two or more of them can be used.

Further, as the raw monomer for forming the unsaturated dicarboxylic acid units destined to be carboxyl group-containing units, maleic acid, maleic acid monomethyl ester, itaconic acid, phthalic acid and the like can be enumerated. Among them, maleic acid and itaconic acid can be preferably used. Any one of them can be used alone or two or more of them can be used.

In view of the dispersibility of the biodegradable resin (A), it is preferred that the melt flow rate (MFR) of the dispersing agent (C-4) at 190° C. and at a load of 21.2N is 1 to 30 g/10 min. A more preferred range is 2 to 15 g/10 min, and a further more preferred range is 3 to 13 g/10 min. In this case, the melt flow rate (MFR) is measured according to JIS K 7210.

In the case where the dispersing agent (C-4) is an epoxy group-containing acrylic resin or styrene resin, in view of the dispersibility of the biodegradable resin (A), it is preferred that the epoxy value is in a range from 0.1 to 10 meq/g. A more preferred range is 1 to 7 meq/g, and a further more preferred range is 2 to 4.5 meq/g. An especially preferred range is 2.5 to 4 meq/g. It is preferred to use an epoxy group-containing acrylic resin or styrene resin with an epoxy value of 0.1 meq/g or more, since the effect of promoting the crystallization of the polyolefin resin (B) is high. It is preferred to use that with an epoxy value of 10 meq/g or less, since it does not happen that gelation or the like lowers the moldability. In this case, the epoxy value is measured by the hydrochloric acid-dioxane method. Meanwhile the epoxy value of a polymer containing epoxy group-containing vinyl units can be adjusted by adjusting the content of epoxy group-containing vinyl units.

In view of excellent handling property, it is preferred that the glass transition temperature of the dispersing agent (C-4) is in a range from 30 to 100° C. A range from 40 to 70° C. is more preferred and a range from 50 to 65° C. is most preferred. The glass transition temperature in this case is measured by DSC according to the method described in JIS K 7121 and is the glass transition temperature at the middle point during heating at 20° C./min. Meanwhile, the glass transition temperature of the dispersing agent (C-4) can be controlled by adjusting the chemical composition of the copolymer components. The glass transition temperature can be usually raised by copolymerizing aromatic vinyl units such as styrene and can be lowered by copolymerizing (meth)acrylic acid ester-based vinyl units such as butyl acrylate.

As the method for producing the dispersing agent (C-4), a continuous bulk polymerization method performed at a high temperature of 150° C. or higher under pressurization (preferably 1 MPa or higher) for a short time (preferably 5 minutes to 30 minutes) is preferred in view of high polymerization percentage and no use of a polymerization initiator, chain transfer agent and solvent respectively causing impurities and sulfur to remain in the product.

Commercially available products of the dispersing agent (C-4) include "JONCRYL (registered trademark)" produced by Johnson Polymer, "Marproof (registered trademark)" produced by NOF Corporation, etc.

As the dispersing agent (C-5), in view of the dispersibility of the biodegradable resin (A), a polyolefin-polystyrene block copolymer containing at least one type of functional groups selected from acid anhydride groups, amino groups, imino groups and epoxy groups is preferred, and a polyolefin-polystyrene block copolymer containing at least one type of functional groups selected from acid anhydride groups and epoxy groups is more preferred. An acid anhydride group-containing polyolefin-polystyrene block copolymer is especially preferred. Further, a polymer with a weight average molecular weight of 1000 to 300000 is more preferred. In this case, the weight average molecular weight is a weight average molecular weight as polymethyl methacrylate (PMMA) measured by gel permeation chromatography (GPC) using hexafluoroisopropanol as the solvent.

The dispersing agent (C-5) contains olefin-based vinyl units and styrene-based vinyl units and it is preferred that the dispersing agent (C-5) contains 70 mass % or more of olefin-based vinyl units and stystrene-based vinyl units. More preferred is 90 mass % or more. The dispersing agent (C-5) can also be a copolymer obtained by copolymerizing preferably 30 mass % or less, more preferably 10 mass % or less of other vinyl units. In this case, the content (mass %) of vinyl units is obtained by measuring the spectrum by solution proton nuclear magnetic resonance ($^1$H-NMR) and calculating from the composition ratio obtained from the integrated intensities of the respective peaks.

In the dispersing agent (C-5), if the polyolefin block is PO and the polystyrene block is PS, then it is preferred in view of the dispersibility of the biodegradable resin (A) that the structure of the block copolymer is a tri-block structure expressed by PS-PO-PS or a di-block structure expressed by PS-PO. A tri-block structure expressed by PS-PO-PS is more preferred. Further, in view of the dispersibility of the biodegradable resin (A), it is preferred that the rate of polystyrene units occupying the polyolefin-polystyrene block copolymer is 5 to 60 mass %. A more preferred range is 10 to 40 mass %.

As the raw monomer for forming the olefin-based vinyl units, particularly preferably enumerated are ethylene, propylene, 1-butene, 1-ptentene, 4-methyl-1-pentene, 1-hexene, 1-heptene, 1-octene, 1-decene, 1-dodecene, 1-tetradecene, 1-hexadecene, 1-octadecene and the like. Among them, ethylene, propylene and 1-butene can be preferably used. Any one of them can be used alone or two or more of them can be used.

As the raw monomer for forming the styrene-based vinyl units, particularly preferably enumerated are styrene, α-methylstyrene, p-methylstyrene, α-methyl-p-methylstyrene, p-methoxystyrene, o-methoxystyrene, 2,4-dimethylstyrene, 1-vinylnaphthalene, chlorostyrene, bromostyrene, divinylbenzene, vinyltoluene and the like. Among them, styrene and α-methylstyrene. can be preferably used. Any one of them can be used alone or two or more of them can be used.

As the raw monomer for forming the epoxy group-containing vinyl units of the dispersing agent (C-5), particularly preferably enumerated are glycidyl esters of unsaturated monocarboxylic acids such as glycidyl (meth)acrylate and glycidyl p-styrylcarboxylate, monoglycidyl esters or polyglycidyl esters of unsaturated polycarboxylic acids such as maleic acid and itaconic acid, unsaturated glycidyl ethers such as allyl glycidyl ether, 2-methylallyl glycidyl ether and styrene-4-glycidyl ether. Among them, in view of radical polymerizability, glycidyl acrylate and glycidyl methacrylate can be preferably used. Any one of them can be used alone or two or more of them can be used.

As raw monomers for forming acid anhydride group-containing vinyl units, maleic anhydride, itaconic anhydride, citraconic anhydride, aconitic anhydride and the like can be enumerated. Above all, maleic anhydride can be preferably used. Any one of them can be used alone or two or more of them can be used.

Further, as the raw monomer for forming the unsaturated dicarboxylic acid units destined to be carboxyl group-containing units, maleic acid, maleic acid monoethyl ester, itaconic acid, phthalic acid and the like can be enumerated. Among them, maleic acid and itaconic acid can be preferably used. Any one of them can be used alone or two or more of them can be used.

In view of the dispersibility of the biodegradable resin (A), it is preferred that the melt flow rate (MFR) of the dispersing agent (C-5) at 190° C. at a load of 21.2N is 1 to 30 g/10 min. A more preferred range is 2 to 20 g/10 min, and a further more preferred range is 3 to 16 g/10 min. In this case, the melt flow rate (MRF) is measured according to JIS K 7210.

In the case where the dispersing agent (C-5) is an acid anhydride group-containing polyolefin-polystyrene block copolymer, it is preferred in view of the dispersibility of the biodegradable resin (A) that the acid anhydride group content is in a range from 0.5 to 4 mass %. A more preferred range is 0.8 to 3 mass %, and a further more preferred range is 1 to 2.5 mass %. It is preferred that the acid anhydride group content is 0.5 mass % or more, since the dispersibility of the biodegradable resin (A) becomes high, and it is preferred that the acid anhydride group content is 4 mass % or less, since it does not happen that the moldability is lowered by gelation and the like.

The glass transition temperature of the dispersing agent (C-5) is not especially limited, but in view of excellent handling property, it is preferred that the temperature is in a range from 30 to 100° C. A more preferred range is 40 to 70° C. In this case, the glass transition temperature is measured by DSC according to the method described in JIS K 7121 and is the glass transition temperature at the middle point during heating at 20° C./min. Meanwhile, the glass transition temperature of the dispersing agent (C-5) can be controlled by adjusting the chemical composition of the copolymer components. Usually, the glass transition temperature can be raised by copolymerizing aromatic vinyl units such as styrene and lowered by copolymerizing olefin-based vinyl units such as ethylene.

The method for producing the dispersing agent (C-5) is not especially limited as far as the conditions specified are satisfied, and a publicly known polymerization method such as bulk polymerization, solution polymerization, suspension polymerization or emulsion polymerization can be used. For example, enumerated are a method comprising the steps of mixing an acid anhydride and a reaction initiator such as an organic peroxide with a polyolefin-polystyrene block copolymer and melt-kneading, and a method comprising the step of letting an acid anhydride and an organic peroxide react with a polyolefin-polystyrene block copolymer in an organic solvent such as benzene, toluene or xylene and the like. The organic peroxide used here is a radical generating agent such as benzoyl peroxide, dicumyl peroxide or t-butyl peroxide.

Commercially available products of the dispersing agent (C-5) include "Kraton (registered trademark) FG" produced by Kraton, "Toughtec (registered trademark)" produced by Asahi Kasei Chemicals Corporation, "Dynatron (registered trademark)" produced by JSR Corporation, etc.

Among these dispersing. agents (C), a polyolefin-polystyrene block copolymer containing at least one type of functional groups selected from the group consisting of acid anhydride groups, carboxyl groups, amino groups, imino groups, alkoxysilyl groups, silanol groups, silyl ether groups, hydroxyl groups and epoxy groups is especially preferred. It is found that in the case where the dispersing agent (C-5) is used, the interfaces between the biodegradable resin (A) and the polyolefin resin (B) become thick compared with the cases of using other dispersing agents though the reason why is not known, and the thick interfaces are estimated to enhance the dispersibility.

Since the dispersing agent (C) is mixed, the affinity between the biodegradable resin (A) and the polyolefin resin (B) can be enhanced to facilitate the control of the sea-isle structure, and the average dispersed particle size of the biodegradable resin (A) as isles can be kept in a range from 1 nm to 1000 nm.

Since the average dispersed particle size of the biodegradable resin (A) can be kept in a range from 1 nm to 1000 nm, the resin composition can be processed into a molded article with moisture-proof property, dimensional stability and the like equivalent or superior to those of the presently available molded olefin articles at productivity equivalent to that of the presently available articles.

To obtain the sea-isle structure in which the biodegradable resin (A) with an average dispersed particle size of 1 nm to 1000 nm is dispersed as isles in the sea component consisting of the polyolefin resin (B), it is preferred that the amounts of the biodegradable resin (A), the polyolefin resin (B) and the dispersing agent (C) satisfy the following ranges:

(1) The content (a) of the biodegradable resin (A) is in a range from 4 to 30 mass %.
(2) The content (b) of the polyolefin resin (B) is in a range from 56 to 95 mass %.
(3) The content (c) of the dispersing agent (C) is in a range from 1 to 20 mass %.
(4) The ratio by mass (a/b) of the content (a) of the biodegradable resin (A) to the content (b) of the polyolefin resin (B) is in a range from 0.05 to 0.42.

If the content of the biodegradable resin (A) is less than 4 mass %, the effect of promoting the crystallization of the polyolefin resin (B) induced by the isles consisting of the biodegradable resin (A) declines greatly. Further, if the content of the biodegradable resin (A) is more than 30 mass %, it is difficult not only to form the sea-isle structure with the biodegradable resin (A) as isles and with the polyolefin resin (B) as sea, but also to keep the average dispersed particle size of the isles consisting of the biodegradable resin (A) in a range from 1 nm to 1000 nm.

If the content of the polyolefin resin (B) is less than 56 mass %, it is difficult not only to form the sea-isle structure with the biodegradable resin (A) as isles and with the polyolefin resin (B) as sea but also to keep the average dispersed particle size of the isles consisting of the biodegradable resin (A) in a range from 1 nm to 1000 nm. Further, if the content of the polyolefin resin (B) is more than 95 mass %, the effect of promoting the crystallization of the polyolefin resin (B) induced by the isles consisting of the biodegradable resin (A) greatly declines.

If the content of the dispersing agent (C) is less than 0.1 mass %, the compatibility between the biodegradable resin (A) and the polyolefin resin (B) declines, and it is difficult to keep the average dispersed particle size of the isles consisting of the biodegradable resin (A) in a range from 1 nm to 1000 nm. Further, if the content of the dispersing agent (C) is more than 25 mass %, the mechanical properties of the molded article are deteriorated.

If the ratio by mass (a/b) of the content (a) of the biodegradable resin (A) to the content (b) of the polyolefin resin (B) is not in a range from 0.05 to 0.42 it is difficult to keep the average dispersed particle size of the isles consisting of the biodegradable resin (A) in a range from 1 nm to 1000 nm.

The resin composition can contain a filler, plasticizer, carboxyl group-reactive compound, stabilizer, antioxidant, ultraviolet light absorber, antistatic agent, blocking prevention agent, lubricant, crystal nucleating agent, releasing agent, flame retarder, colorant such as dye or pigment, another thermoplastic resin and the like to such an extent that the object of this disclosure is not impaired.

If a filler is mixed, a resin composition excellent in mechanical properties, moldability, heat resistance and the like can be obtained. As the filler, a fibrous, sheet-like, granular or powdery filler usually used as a filler in thermoplastic resins can be used. Preferred particular examples of the filler include glass fibers, wollastonite, aluminum borate whiskers, potassium titanate whiskers, talc, mica, kaolin, hemp fibers, bamboo fibers, kenaf fibers, jute fibers, paper dust, wood flour and the like. It is preferred that the aspect ratio of a fibrous filler is 5 or more. More preferred is 10 or more, and further more preferred is 20 or more. Any one of these fillers can be used or two or more of them can be used. Further, the filler can also be treated to be covered or bundled with a thermoplastic resin such as ethylene/vinyl acetate copolymer or a thermosetting resin such as an epoxy resin, or treated with a coupling agent such as aminosilane or epoxy-silane.

It is preferred that the mixed amount of the filler is 1 to 300 parts by weight per 100 parts by weight in total of the biodegradable resin (A) and the polyolefin resin (B). A more preferred range is 5 to 150 parts by weight.

If a plasticizer is mixed, a resin composition excellent in mechanical properties, moldability and the like can be obtained. As the plasticizer, a generally well-known plasticizer can be used. In view of bleed-out resistance, preferred are polyalkylene glycol-based plasticizers including polyalkylene glycols such as polyethylene glycol, polypropylene glycol, poly(ethylene oxide/propylene oxide) block and/or random copolymer, polytetramethylene glycol, ethylene oxide addition polymer of bisphenol, propylene oxide addition polymer of bisphenol and tetrahydrofuran addition polymer of bisphenol, terminal blocked compounds thereof such as terminal epoxy-modified compounds, terminal ester-modified compounds and terminal ether-modified compounds, polyvalent carboxylic acid ester-based plasticizers such as bis(butyl diglycol)adipate, methyl diglycol butyl diglycol adipate, benzyl methyl diglycol adipate, acetyl tributyl citrate, methoxycarbonylmethyl dibutyl citrate and ethoxycarbonylmethyl dibutyl citrate, and glycerol-based plasticizers such as glycerol monoacetomonolaurate, glycerol diacetomonolaurate, glycerol monoacetomonostearate, glycerol diacetomonooleate and glycerol monoacetomonomontanate. Any one of these plasticizers can be used or two or more of them can be used.

It is preferred that the mixed amount of the plasticizer is in a range from 0.01 to 50 parts by weight per 100 parts by weight in total of the biodegradable resin (A) and the polyolefin resin (B). A more preferred range is 0.5 to 20 parts by weight.

If a carboxyl group-reactive compound is mixed, the resin composition can be further enhanced in durability and toughness. The carboxyl group-reactive compound is not especially limited, if it is a compound capable of reacting with the carboxyl terminal groups of the biodegradable resin (A), but a compound also capable of reacting with the carboxyl groups of the low-molecular acid compound produced by thermal decomposition, hydrolysis and the like of the biodegradable resin (A) is more preferred. A compound also capable of reacting with the hydroxyl terminal groups of the low-molecular acid compound produced by thermal decomposition is further more preferred.

As the carboxyl group-reactive compound, it is preferred to use at least one compound selected from glycidyl ether compounds, glycidyl ester compounds, glycidylamine compounds, glycidylimide compounds, alicyclic epoxy compounds, epoxy group-containing compounds, oxazoline compounds such as 2,2'-m-phenylenebis(2-oxazoline) and 2,2'-p-phenylene-bis(2-oxazoline), oxazine compounds, carbodiimide compounds such as N,N'-di-2,6-diisopropylphenyl-carbodiimide, 2,6,2',6'-tetraisopropyldiphenyl-carbodiimide and polycarbodiimide. Among them, an epoxy group-containing compound and/or a carbodiimide compound is preferred.

It is preferred that the amount of the carboxyl group reactive compound is 0.01 to 10 parts by weight per 100 parts by weight in total of the biodegradable resin (A) and the polyolefin resin (B). A more preferred range is 0.05 to 5 parts by weight.

In the case where a carboxyl group-reactive compound is added, it is preferred to add a reaction catalyst of the carboxyl group-reactive compound. The reaction catalyst in this case refers to a compound having an effect of promoting the reactions between the carboxyl group-reactive compound and the terminals of the biodegradable resin (A) and the carboxyl groups of the low-molecular acid compound. A compound with an effect of promoting reactions even if the added amount thereof is small is preferred. It is preferred that the reaction catalyst of the carboxyl group-reactive compound also has an effect of promoting the reaction with the hydroxyl groups of the low-molecular acid compound produced by thermal decomposition. As the reaction catalyst, for example, an alkali metal compound, alkaline earth metal compound or phosphoric acid ester is preferred. The added amount of the reaction catalyst is not especially limited, but it is preferred that the amount is 0.001 to 1 part by weight per 100 parts by weight in total of the biodegradable resin (A) and the polyolefin resin (B). A more preferred range is 0.01. to 0.2 part by weight, and the most preferred range is 0.02 to 0.1 part by weight.

The carboxyl group-reactive compound is only required to be able to react adequately with the carboxyl terminal groups and the low-molecular acid compound, depending on the application of the resin composition. Particularly in view of hydrolysis resistance, it is preferred to let the compound react for achieving an acid concentration of 10 equivalents/$10^6$ g or less in the resin composition. It is more preferred to let the compound react for achieving 5 equivalents/$10^6$ g or less, and it is further more preferred to let the compound react for achieving 1 equivalent/$10^6$ g or less. The acid concentration in the resin composition can be measured by dissolving the resin composition in an appropriate solvent and titrating in an alkali compound solution with a known concentration of, for example, sodium hydroxide, or by nuclear magnetic resonance (NMR).

If an antistatic agent is added, the resin composition can have antistatic performance. As the antistatic agent, a generally well-known antistatic agent can be used. For example, a publicly known cationic antistatic agent, anionic antistatic agent, amphoteric antistatic agent or nonionic antistatic agent can be used. As the method for making the resin composition antistatic, a method of coating the surface of the molded article or the method of melt-kneading the antistatic agent in the resin composition can be used. However, in the case where the antistatic agent is melt-kneaded in the resin composition, since the use of an ionic antistatic agent may cause the biodegradable resin (A) to be decomposed at the time of melt-kneading, a nonionic antistatic agent can be preferably used. As the nonionic antistatic agent, enumerated are polyhydric alcohols such as (poly)ethylene glycol, (poly)propylene glycol, glycerol and sorbitol, fatty acid esters thereof and the like.

For preventing blocking and improving the handling property in the case where the resin composition is processed into a molded article, above all, a sheet or film, a blocking prevention agent may also be added to the resin composition. The blocking prevention agent is particles added to the resin composition for the purpose of roughening the surface of the molded article. As the blocking prevention agent, usable are inert particles of cohesive silica, colloidal silica, aluminosilicate, crosslinked PMMA, crosslinked polystyrene, calcium carbonate and the like. Especially, cohesive silica, colloidal silica or aluminosilicate is preferred.

Another thermoplastic resin can also be mixed, since a resin composition excellent in mechanical properties, moldability, heat resistance and the like can be obtained. Above all, it is preferred to mix methacrylic resin in view of transparency.

Further, in view of impact resistance and heat resistance, it is preferred to mix an impact resistance improving agent with the resin composition. An impact resistance improving agent is a substance that is not contained in the biodegradable resin (A), the polyolefin resin (B) or the dispersing agent (C) and has an effect as an elastomer. As the impact resistance improving agent, in view of impact resistance, heat resistance and mechanical properties, preferred is an unreactive elastomer incapable of reacting with any of the components of the biodegradable resin (A), the polyolefin resin (B) and the dispersing agent (C). Particularly, acrylic rubber diene rubber, copolymers consisting of diene units and vinyl units, hydrogenated copolymers thereof, polyisobutylene, copolymer consisting of isobutylene and butadiene or isoprene, natural rubber, Thiokol rubber, polysulfide rubber, polyurethane rubber, polyether rubber, epichlorohydrin rubber and the like can be enumerated. Examples of the copolymers consisting of diene units and vinyl units and hydrogenated copolymers thereof include styrene/butadiene random copolymer, styrene/butadiene block copolymer, styrene/butadiene/styrene block copolymer (SBS), styrene/isoprene random copolymer, styrene/isoprene block copolymer, styrene/isoprene/styrene block copolymer (SIS), copolymer obtained by graft-copolymerizing styrene to polybutadiene, butadiene/acrylonitrile copolymer, styrene/butadiene/butylene/styrene block copolymer. (SBBS), styrene/ethylene/butylene/styrene block copolymer (SEBS), styrene/ethylene/propylene block copolymer (SEP), styrene/ethylene/propylene/styrene block copolymer (SEPS), styrene/ethylene/ethylene/propylene/styrene block copolymner (SEEPS) and the like. Further, a multilayer structure polymer called a core-shell elastomer consisting of a core layer and one or more shell, layers covering the core layer, in which the adjacent layers consist of dissimilar polymers or the like can also be used. In view of impact resistance, heat resistance and mechanical properties, as the impact resistance improving agent, at least one or more selected from SBS, SIS, SBBS, SEBS, SEP, SEPS, SEEPS and core-shell elastomer are preferred. At least one or more selected from SBBS, SEBS, SEPS, SEEPS and core-shell elastomer are more preferred. SEBS or SEPS is further preferred, and SEBS is most preferred.

In the case where the impact resistance improving agent is a copolymer consisting of diene units and vinyl units or a hydrogenated copolymer thereof, it is preferred in view of excellence in impact resistance, heat resistance and toughness that the vinyl units are aromatic vinyl units. More preferred are styrene units. Further, in view of special excellence in the balance among impact resistance, heat resistance and toughness, it is preferred that the amount of vinyl units is 1 to 30 mass %. A more preferred range is 5 to 15 mass %.

The method for producing the resin composition is not especially limited as far as the requirements specified in this disclosure are satisfied. For example, preferably used are a method comprising the steps of blending the biodegradable resin (A), the polyolefin resin (B), the dispersing agent (C): and as required other additives beforehand, and homogeneously melt-kneading at higher than the melting points using a single-screw or double-screw extruder and the like, a method of mixing the ingredients in a solution and subsequently volatilizing the solvent for removal, and so on.

As the method, for melt-kneading using a single-screw or double-screw extruder and the like, for example, preferred are a method comprising the step of melt-kneading the biodegradable resin (A), the polyolefin resin (B), the dispersing agent (C) and other additives as a package, a method comprising the steps of melt-kneading the biodegradable resin (A), the polyolefin resin (B) and the dispersing agent (C) beforehand, for obtaining a resin composition and subsequently, as required, melt-kneading the resin composition with other additives, a method comprising the steps of supplying the biodegradable resin (A), the polyolefin resin (B)

and the dispersing agent (C) via the main feeder and as required supplying other additives via the side feeder provided at the tip portion of the extruder, and so on. Meanwhile, in the case where a filler is mixed, a method of supplying the biodegradable resin (A), the polyolefin resin (B), the dispersing agent (C) and additives other than the filler via the main feeder as a package and supplying the filler via the side feeder is preferred.

When the resin composition is produced, it is preferred that the melt kneading temperature is 170 to 250° C. A more preferred range is 175 to 230° C., and an especially preferred range is 180 to 220° C.

The resin composition can be processed into a molded article by publicly known various molding methods. Preferred molding methods are injection molding, extrusion molding, press molding, blow molding and the like. Further, even if the resin composition is processed into a sheet, film, fibers or the like, it is very useful.

In the case where the resin composition is injection-molded, it is preferred in view of heat resistance, moldability and appearance that the mold temperature is 30° C. or higher. More preferred is 70° C. or higher. In view of the possibility to inhibit the deformation of specimens, it is preferred that the mold temperature is 120° C. or lower. More preferred is 99° C. or lower, and further more preferred is 90° C. or lower.

In view of impact resistance, it is preferred that the Izod impact strength of the resin composition is 30 J/m. or more. More preferred is 40 J/m or more, and further more preferred is 50 J/m or more. In this case, the Izod impact strength is the Izod impact strength of a molded and notched 3 mm thick strip measured according to ASTM D256.

In view of heat resistance, it is preferred that the deflection temperature of the resin composition at a load of 0.45 MPa is 70° C. or higher. More preferred is 80° C. or higher, and further more preferred is 85° C. or higher. Especially preferred is 90° C. or higher, and most preferred is 100° C. or higher. In this case, the deflection temperature under load is the deflection temperature of a molded article of 12.7 mm×127 mm×3 mm under load measured according to ASTM D648.

For achieving both impact resistance and heat resistance, it is preferred that the Izod impact strength is 40 J/m or more and that the deflection temperature at a load of 0.45. MPa is 85° C. or higher. It is more preferred that the Izod impact strength is 50 J/m or more and that the deflection temperature at a load of 0.45 MPa is 100° C. or higher.

The molded article formed of the resin composition can be used for any application. Since the crystallinity of the polyolefin resin (B) as the sea component is improved, the molded article has excellent heat resistance. Therefore, it can be preferably used as interior parts and exterior parts of automobiles, various housings of electric/electronic parts, gears, architectural members, civil engineering members, agricultural materials, packaging materials, daily necessities and the like.

In the case where a film is selected as a mode of the molded article formed of the resin composition, it is preferred to stretch the film at least in one direction. The stretching improves the fragility of the film and enhances the transparency. Biaxial stretching is more preferred since a film well-balanced and less anisotropic in physical properties can be obtained. In the case of biaxial stretching, either sequential biaxial stretching in which stretching in one direction is followed by further stretching in the direction perpendicular to the one direction or simultaneous biaxial stretching in which stretching in one direction and stretching in the direction perpendicular to the one direction are performed simultaneously can be preferably used. The stretching in the machine direction and the stretching in the transverse direction can also be performed respectively multiple times. For film formation, any of tenter method, inflation method and tubular method can be used. For example in the tenter method, the molten, resin composition extruded from a die as a film is brought into contact with a casting drum by air knife or electrostatic application, to be cooled and solidified, for obtaining a cast film. The cast film can be stretched in one direction or two directions, to obtain a stretched film.

The film is excellent in water vapor barrier property and low in heat shrinkage percentage, since the biodegradable resin (A) finely dispersed as isles of 1 nm to 1000 nm enhances the crystallinity of the sea component consisting of the polyolefin resin (B).

It is preferred to use the film as a packaging film, since the excellent water vapor barrier property can prevent the packaged material from being dried. In view of the prevention of drying of packaged material, it is preferred that the water vapor permeability in an environment of 40° C. and 90% RH is 0.1 to 300 g/m$^2$ day. A more preferred range is 0.1 to 100 g/m$^2$ day, and a further more preferred range is 0.1 to 30 g/m$^2$ day.

On the other hand, since the film is low in oxygen or other gas barrier property, the film can be provided with a barrier layer for more suitable use. The barrier layer can be formed by such a method as coating, vapor deposition, lamination or the like. It is preferred to form the barrier layer by vapor deposition, since the barrier layer does not depend on humidity and can exhibit the barrier property even if it is thin.

It is preferred that the barrier layer formed by vapor deposition is formed of aluminum, aluminum oxide, silicon oxide, cerium oxide, calcium oxide, diamond-like carbon film or their mixture. Especially an aluminum vapor-deposited film is more preferred, since it is excellent in economy and gas barrier performance. Further, the vapor deposition layer can be formed by a physical vapor deposition method such as vacuum vapor deposition method, EB vapor deposition method, sputtering method or ion plating method, or a chemical vapor deposition method such as plasma CVD. However, in view of productivity, the vacuum vapor deposition method can be especially preferably used.

When the vapor deposition layer is formed, it is preferred to pretreat the surface to be vapor-deposited, by such a method as corona discharge treatment beforehand for improving the vapor deposition layer contact property. In the case where corona treatment is applied, it is preferred that the treatment intensity is 5 to 50 W·min/m$^2$. A more preferred range is 10 to 45 W·min/m$^2$. Further, surface treatment such as plasma treatment, alkali treatment or electron beam radiation treatment can also be applied as required.

Further, if vapor deposition and coating are used together, a higher gas barrier property can be obtained. Coating the film with a primer inline or offline beforehand is effective for enhancing the gas barrier property, since a vapor deposition film with a high contact property can be obtained. Furthermore, if the vapor deposition film is coated with an anchor coating material, the defects of the vapor deposition film can be complemented to enhance the gas barrier property.

The film has a low heat shrinkage percentage and high thermal dimensional stability suitably for vapor deposition processing and the like, having an excellent vapor deposition property. In the case where the film is used as a packaging film, in view of dimensional stability, it is preferred that the heat shrinkage percentage of the film in the machine direction is 6% or less and that the heat shrinkage percentage in the transverse direction is 4% or less at a temperature of 120° C. based on JIS Z 1712. It is more preferred that the heat shrinkages percentage in the machine direction is 5% or less and that the heat shrinkage percentage in the transverse direction is 3% or less. It is further more preferred that the heat shrinkage percentage in the machine direction is 4% or less and that the heat shrinkage percentage in the transverse direction is 2% or less.

Moreover, in view of exhibition of an excellent design property as a packaging film, it is preferred that the heat shrinkage percentage in the machine direction is 4% or less and that the heat shrinkage percentage in the transverse direction is 2% or less at a temperature of 120° C. based on JIS Z 1712. It is more preferred: that the heat shrinkage percentage in the machine direction at a temperature of 120° C. is 3.5% or less and that the heat shrinkage percentage in the transverse direction is 1.8% or less. It is further more preferred that the heat shrinkage percentage in the machine direction at a temperature of 120° C. is 2.5% or less and that the heat shrinkage percentage in the transverse direction is 1.5% or less.

The film can be used for any application, but since the film has excellent properties such as an excellent water vapor barrier property and a low heat shrinkage percentage, it can be preferably used as a packaging film. Particular applications of the packaging film include food packaging such as snack packaging, miscellaneous packaging, garbage bags, vegetable packaging, window envelopes, easy-peel packaging, wrapping films of electric/electronic parts, covering films, candy packaging and the like.

The thickness of the film is not especially limited, but in the case where the film is used as a packaging film, it is preferred that the thickness is 1 to 1000 μm. A more preferred range is 3 to 300 μm, and a further more preferred range is 5 to 100 μm.

Further, the film may also employ a composite layer configuration. If such a composite layer configuration is employed, the processability for printing, coating and the like can be enhanced.

In the case where fibers are selected as a mode of the molded article formed of the resin composition, a nonwoven fabric is preferred in view of mechanical strength.

It is preferred that the, single fiber fineness of fibers is 0.8 to 20 decitexes. A more preferred single fiber fineness range is 0.9 to 12 decitexes, and a further more preferred range is 1.0 to 6 decitexes. In the case where the single fiber fineness is less than 0.8 decitex, spinnability declines. Further, also in the case where the single fiber fineness is more than 20 decitexes, spinnability declines since the fibers cannot be sufficiently cooled. Mixing fibers different in single fiber fineness does not raise any problem either. Further, the sectional form of fibers is not limited either at all, and a circular form, hollow circular form or special form such as X or Y can be preferably used, but in view of simple production, a circular form is preferred.

In view of dimensional stability, it is preferred that the dry heat shrinkage percentage of the nonwoven fabric at 120° C. is 10% or less. More preferred is 5% or less, and further more preferred is 3% or less. In the case where the dry heat shrinkage percentage of the nonwoven fabric at 120° C. is higher than 10%, the nonwoven fabric is likely to be wrinkled.

It is preferred that the unit-area weight of the nonwoven fabric is 5 to 100 g/m$^2$. If the unit area weight is lower than 5 g/m$^2$, the strength of the nonwoven fabric declines. If the unit-area weight is higher than 100 g/m$^2$, the cost per unit area becomes high and the softness declines though the strength is sufficient. A more preferred unit-area weight range is 7 to 90 g/m$^2$, and a further more preferred range is 10 to 70 g/m$^2$.

With regard to the softness of the nonwoven fabric, it is preferred that the value measured by the 45° cantilever method is in a range from 10 to 150 mm. It is not preferred that the value measured by the 45° cantilever method is smaller than 10 mm, since a practical mechanical strength may not be achieved as the case may be. Further, it is not preferred either that the measured value is larger than 150 mm, since the nonwoven fabric is not suitable especially for sanitary materials because of poor softness. A more preferred softness range is 15 to 120 mm, and a further more preferred range is 20 to 100 mm.

The method for producing the nonwoven fabric is not especially limited, but the spun-bond method or the method of producing a nonwoven short-fiber fabric is preferred since the production method is simple and excellent in production capability. In view of mechanical strength, the spun-bond method is preferred. The method of producing a nonwoven short-fiber fabric can be a paper making technique or dry process.

In the spun-bond method, a molten polymer is extruded from a nozzle and sucked and stretched by a high speed suction gas, and the fibers are collected on a traveling conveyor to form a web. The web is further continuously thermally bonded, entangled or the like, to be integrated for forming a sheet.

In the paper making technique, short fibers are scooped onto a wire netting, to form a nonwoven fabric. It is preferred that the short fibers have a cut length of 1 to 25 mm. A more preferred range is 3 to 15 mm. It is not preferred that the cut length is shorter than 1 mm, since it may become difficult to form a woven fabric as the case may be. It is not preferred either that the cut length is longer than 25 mm, since it may become difficult to obtain a uniform nonwoven fabric as the case may be.

Further, the short fibers can be crimped as predetermined by a stuffing box method or penetration heat gear method before they are cut. In the case where the nonwoven short-fiber fabric is produced by a dry-process, it is preferred that the number of crimp folds of short fibers is 5 to 50 per 25 mm. A more preferred range is 10 to 30 per 25 mm. It is preferred that the cut length of short fibers is 10 to 80 mm. A more preferred range is 20 to 60 mm. It is not preferred that the number of crimp folds is less than 5 per 25 mm, since fibers are likely to remain closed when they are opened. It is not preferred either that the number of crimp folds is more than 50 per 25 mm, since the fibers may not be opened uniformly as the case may be.

It is preferred that the nonwoven fabric is partially thermally bonded to be integrated. It is preferred that the thermally bonded area is 5 to 50% of the entire area of the nonwoven fabric. A more preferred range is 8 to 45%, and a further more preferred range is 10 to 30%. It is not preferred that the thermally bonded area is smaller than 5%, since the strength of the nonwoven fabric tends to be weak. Further, it is not preferred either that the thermally bonded area is larger than 50%, since the softness tends to be impaired though the mechanical strength of the nonwoven fabric is excellent. The partially thermally bonding method is not especially limited, but bonding by a pair of hot embossing rolls for bonding by an ultrasonic oscillator and an embossing roll is a preferred method. In view of strength, bonding by a pair of hot embossing rolls is more preferred. It is preferred that the temperature of thermal bonding by the hot embossing rolls is lower than the melting point of the resin existing on the surfaces of the fibers by 5 to 50° C. It is more preferred that the temperature is lower by 10 to 40° C. In the case where the temperature of the thermal bonding by the hot embossing rolls is lower than the melting point of the resin existing on the surfaces of the fibers by less than 5° C., the resin is heavily molten and it can happen that the sheet is wound around the embossing rolls and that the rolls are soiled. Further, it is not preferred either that the temperature of the thermal bonding by the hot embossing rolls is lower than the melting point of the resin existing on the surfaces of the fibers by more than 50° C., the fusion bonding of the resin tends to be insufficient.

Further, it is preferred that the nonwoven fabric contains at least one of a fluorine compound, polyolefin compound and silicone compound as a water repellent. The most preferred water repellent is a fluorine compound in view of excellent water repellent performance. It is preferred that the amount of the water repellent is 0.05 to 5 wt % based on the weight of the nonwoven fabric. It is not preferred that the added amount of the water repellent is less than 0.05 wt % based on the weight of the nonwoven fabric, since water repellency and water resistance decline. It is not preferred either that the added amount of the water repellent is more than 5 wt % based on the weight of the nonwoven fabric, since the air permeability of the nonwoven fabric is lost as the case may be while the cost becomes high.

The nonwoven fabric can be used for any application, but since it is excellent in mechanical strength and softness and good in water resistance, it can be preferably used as sanitary materials. Examples of the sanitary materials include disposable clothing thrown away after use of once or so such as protective clothing and underwear; sanitary articles such as sanitary napkins and panty shields; disposable diapers such as paper diapers for adults, paper diapers for babies and pads for incontinent people; bedding such as bed covers and pillow cases; kitchen articles such as aprons and gloves and the like.

Our compositions, methods and articles are described below in more detail in reference to examples, but are not limited thereto or thereby.

The following methods were used for measurement and the like.

MFR

MFR was measured according to JIS K 7210 (1999) at a temperature of 190° C. or 230° C. and a load of 21.2N.

Average Dispersed Particle Size

An ultrathin section specimen was prepared using a microtome in such a manner that a cross section of a pellet formed of a resin composition became the sample surface, and the cross section of the ultrathin section specimen was photographed using a transmission electron microscope (H-7100FA produced by Hitachi High Technologies Corporation) at an accelerating voltage of 100 kV and a magnification of 5000×. In the isle component observed in the photograph, the minor axis lengths of arbitrarily selected 10 isles were measured and averaged to obtain the average dispersed particle size.

Moldability

Pellets formed of a resin composition were supplied into an injection molding machine (SG75H-HIV produced by Sumitomo Heavy Industries, Ltd.) and injection-molded at a cylinder temperature of 200° C. and a mold temperature of 50° C. to obtain ASTM No. 1 dumbbell tensile specimens with a thickness of 3 mm specified in ASTM D638, (1995). When the specimens were out of the mold, the shortest time in which a non-deformed and solidified specimen was molded was measured as the molding cycle time. A shorter molding cycle time means more excellent moldability.

Impact Resistance (Izod Impact Strength)

The Izod impact strength of a molded and notched 3 mm thick strip was measured according to ASTM D256 (1995).

Heat Resistance (DTUL)

The deflection temperature of a molded article of 12.7 mm×127 mm×3 mm at a load of 0.45 MPa was measured according to ASTM D648 (2004).

Tensile Strength and Breaking Elongation

A tensile test of a molded ASTM No. 1 dumbbell specimen with a thickness of 3 mm was performed according to ASTM D638 (1995).

Evaluation of Film

Film Formability

When films were prepared from resin compositions a stably formed film was evaluated as A; a broken or visually surface-roughened film as B; and a film not allowing biaxial stretching as C.

Thickness of Film

A dial thickness gauge was used to measure the thickness according to JIS B 7509 (1955).

Water Vapor Barrier Property

A water vapor permeability measuring instrument {"Permatran" (registered trademark) W3/31} produced by Mocon, USA was used to measure the water vapor permeability at a temperature of 40° C. and a humidity of 90% RH based on the method B (infrared sensor method) described in JIS K 7129 (1992). The measurement was performed twice to obtain the average of the two measured values.

Heat Shrinkage Percentage

The shrinkage percentage after heating at 120° C. for 15 minutes was measured according to JIS Z 1712 (1997).

Evaluation of Nonwoven Fabric

Spinnability

When nonwoven fabrics were prepared from resin compositions, stable spinnability was evaluated as A; irregular spinnability; and no spinnability as C.

Single Fiber Fineness (Decitexes)

Ten small samples were taken from a nonwoven fabric at random and photographed at a magnification of 503× to 3000× using a scanning electron microscope. The diameters of ten fibers selected from each sample, namely, 100 fibers in total were measured, and the mean value was recorded as the fiber diameter. From the obtained fiber diameter and the density of the polymer, the fineness was calculated.

Unit-Area Weight (g/m$^2$)

Three samples of lengthwise 50 cm×crosswise 50 cm each were taken from a nonwoven fabric according to 4.2 of JIS L 1906 (1994), and the weights of the respective samples were measured. A mean value calculated from the measured values was converted into a value per unit area, for obtaining the unit-area weight (g/m$^2$) of the nonwoven fabric.

Tensile Tenacity

Specimens of 5 cm wide×30 cm long each were cut out of a nonwoven fabric. Each specimen was set at a grip interval of 20 cm and pulled at a stress rate of 10 cm/min. The tensile tenacities of three specimens each in the lengthwise direction and in the widthwise direction of the nonwoven fabric were measured according to 4.3.1 of JIS L 1906 (1994). The respective mean values were converted into the tenacities per 100 g/m$^2$. A nonwoven fabric of 30 N/5 cm. or more in both lengthwise direction and widthwise direction was accepted, and a nonwoven fabric not conforming to this condition was rejected.

Dry-Heat Shrinkage Percentage

A specimen of 5 cm wide×30 cm long was cut out of a nonwoven fabric and held in an hot air oven at a temperature of 120° C. for 15 minutes, to obtain the dry heat shrinkage percentage from the following formula, $$\text{Dry heat shrinkage percentage (\%) of nonwoven fabric} = \{(A0-A1)/A0\} \times 100$$

A0: Original dimension in the machine direction (cm)
A1: Dimension in the machine direction after heat treatment (cm)

In the examples, the following raw materials were used:
Biodegradable Resin (A)
- (A-1) Poly-L-lactic acid resin (D form 1.2%, Mw (as PMMA) 160000, melting point 168° C.)

Polyolefin Resins (B)
- (B-1) Polypropylene resin (J106G produced by Prime Polymer Co., Ltd., MFR 15 g/10 min (230° C., 21.2N), melting point 169° C.)
- (B-2) Polypropylene resin (F122G produced by Prime Polymer Co., Ltd., MFR 2 g/10 min (230° C., 21.2N), melting point 169° C.)
- (B-3) Polypropylene resin ("Nobrene" WF836DG3 produced by Sumitomo Chemical Co., Ltd., MFR 7 g/10 min (230° C., 21.2N), melting point 163° C.)

Compatibilizing Agents (C)
- (C-1) Ethylene/vinyl acetate copolymers
  - (C-1-1) Ethylene/vinyl acetate copolymer resin ("Evaflex (registered trademark)" 40LX produced by Du Pont-Mitsui Polychemicals Co., Ltd., vinyl acetate content 41 wt %, MFR 2 g/10 min (190° C., 21.2N))
  - (C-1-2) Ethylene/vinyl acetate copolymer resin ("Levapren (registered trademark)" 700H produced by Lanxess, vinyl acetate content 70 wt %, MFR 4 g/10 min (190° C., 21.2N))
- (C-2) Ethylene/(meth)acrylic acid ester copolymers
  - (C-2-1) Ethylene/ethyl acrylate copolymer resin ("Evaflex (registered trademark)" EEA A-713. produced by Du Pont-Mitsui Polychemicals Co., Ltd., ethyl acrylate content 25 wt %, MFR 20 g/10 min (190° C., 21.2N))
  - (C-2-2) Ethylene/ethyl acrylate/methyl methacrylate copolymer resin ("Modiper (registered trademark)" A5200 produced by NOF Corporation, melting point 72° C., ethyl acrylate content 20 wt %, methyl methacrylate content 30 wt %, MFR 3 g/10 min (190° C., 21.2N)):
- (C-3) Polyolefin resins containing at least one type of functional groups selected from acid anhydride groups, carboxyl groups, amino groups, imino groups, alkoxysilyl groups, silanol groups, silyl ether groups, hydroxyl groups and epoxy groups
  - (C-3-1) Ethylene/glycidyl methacrylate copolymer resin ("Bondfast (registered, trademark)" 7L produced by Sumitomo Chemical Co., Ltd., glycidyl methacrylate. content 6 wt %, methyl acrylate content 27 wt %, MFR 3 g/10 min (190° C., 21.2N)
  - (C-3-2) Maleic anhydride graft modified polypropylene resin ("OREVAC" 18750 produced by Arkema, maleic anhydride content 1 wt %, MFR 35 g/10 min (230° C., 21.2N))
  - (C-3-3) Maleic anhydride modified polypropylene resin ("Admer (registered. trademark)" QF731 produced, by Mitsui Chemicals, Inc., MFR 3 g/10 min (230° C., 21.2N))
- (C-4) Acrylic resin or styrene resin containing at least one type of functional groups selected from acid anhydride groups, carboxyl groups, amino groups, imino groups alkoxysilyl groups, silanol groups, silyl ether groups, hydroxyl groups and epoxy groups
  - (C-4-1) Epoxy group-containing styrene/acrylic acid ester copolymer ("JONCRYL (registered trademark)" ADR-4368 produced by Johnson Polymer, weight average molecular weight 8000, epoxy value 3.5 meq/g)
  - (C-4-2) Epoxy group-containing acrylic copolymer ("Marproof (registered trademark)" 2050M produced. by NOF Corporation, weight average molecular weight 210000, epoxy value 2.9 meq/g)
- (C-5) Polyolefin-polystyrene block copolymers containing at least one type of functional groups selected from acid anhydride groups, carboxyl groups, amino groups, imino groups, alkoxysilyl groups, silanol groups, silyl ether groups, hydroxyl groups and epoxy groups
  - (C-5-1) Maleic anhydride modified SEBS ("Kraton (registered. trademark)" FG1901 produced by Kraton Polymer, styrene content 30 wt %, maleic anhydride content 1.7 wt %, MFR 11 g/10 min (230° C., 21.2N)).
  - (C-5-2) Maleic anhydride modified SEBS ("Toughtec (registered trademark)" M1943 produced by Asahi Kasei Chemicals Corporation, styrene content 20 wt %, MFR 8 g/10 min (230° C., 21.2N))
  - (C-5-3) Imine group modified SEBS ("Toughtec (registered trademark)" N503 produced by Asahi Kasei Chemicals Corporation, styrene content 30 wt %, MFR 20 g/10 min (230° C., 21.2N))
  - (C-5-4) Amino group modified SEBS ("Dynatron (registered trademark" 8630P produced by JSR Corporation, styrene content 15 wt %, MFR 15 g/10 min (230° C., 21.2N))

EXAMPLES

Examples 1 to 18 and Comparative Examples 1 to 4

Raw materials as shown in Tables 1 and 2 were mixed, and the mixture of each example or comparative example was supplied into a 30 mm diameter double-screw extruder (TEX-30α produced by The Japan Steel Works, Ltd.) and melt-kneaded at a cylinder temperature of 220° C. and a speed of 250 rpm. The melt-kneaded resin composition was discharged as a strand with a diameter of about 3 mm into water of 10° C., to be solidified, and cut at a length of 4 mm, to obtain resin composition pellets.

The obtained resin composition was injection-molded using an injection molding machine. (SG75H-HIV produced by Sumitomo Heavy Industries, Ltd.) at a cylinder temperature of 200° C. and a mold temperature of 50° C., to obtain molded articles for various evaluations. The evaluation results of the obtained molded articles are shown in Table 3.

As shown in Tables 1 and 2, it can be seen that the resin compositions are excellent in productivity and that the molded articles are excellent in impact resistance, heat resistance and mechanical properties.

TABLE 1

|  |  |  | Example | | | | | | | | | | |
| --- | --- | --- | --- | --- | --- | --- | --- | --- | --- | --- | --- | --- | --- |
|  |  |  | 1 | 2 | 3 | 4 | 5 | 6 | 7 | 8 | 9 | 10 | 11 |
| Biodegradable resin (A) | A-1 | parts by weight | 5 | 25 | 20 | 25 | 20 | 20 | 20 | 5 | 20 | 20 | 20 |
| Polyolefin resin (B) | B-1 | parts by weight |  | 65 | 70 | 60 |  |  | 70 |  | 70 | 70 | 70 |
|  | B-2 | parts by weight | 90 |  |  |  | 70 | 70 |  | 90 |  |  |  |

TABLE 1-continued

|  |  |  | Example | | | | | | | | | | |
|---|---|---|---|---|---|---|---|---|---|---|---|---|---|
|  |  |  | 1 | 2 | 3 | 4 | 5 | 6 | 7 | 8 | 9 | 10 | 11 |
| Compatibilizing agent (C) | C-1-1 | parts by weight | 5 | 10 | | | | | | | | | |
|  | C-1-2 | parts by weight | | | 10 | | | | | | | | |
|  | C-2-1 | parts by weight | | | | 15 | | | | | | | |
|  | C-2-2 | parts by weight | | | | | 10 | | | | | | |
|  | C-3-1 | parts by weight | | | | | | 10 | | | | | |
|  | C-3-2 | parts by weight | | | | | | | 10 | | | | |
|  | C-3-3 | parts by weight | | | | | | | | 5 | 10 | | |
|  | C-4-1 | parts by weight | | | | | | | | | | 10 | |
|  | C-4-2 | parts by weight | | | | | | | | | | | 10 |
|  | C-5-1 | parts by weight | | | | | | | | | | | |
|  | C-5-2 | parts by weight | | | | | | | | | | | |
|  | C-5-3 | parts-by weight | | | | | | | | | | | |
|  | C-5-4 | parts by weight | | | | | | | | | | | |
| Average dispersed particle size of biodegradable resin (A) [nm] | | | 850 | 750 | 800 | 900 | 850 | 720 | 880 | 980 | 830 | 930 | 880 |
| Molding cycle time [sec] | | | 35 | 35 | 35 | 35 | 40 | 40 | 45 | 40 | 45 | 35 | 40 |
| Impact strength [J/m] | | | 60 | 75 | 40 | 43 | 60 | 42 | 48 | 49 | 48 | 40 | 35 |
| Heat resistance [° C.] | | | 92 | 80 | 86 | 90 | 91 | 90 | 100 | 95 | 94 | 92 | 96 |
| Tensile strength [MPa] | | | 30 | 38 | 30 | 30 | 32 | 30 | 40 | 43 | 40 | 37 | 33 |
| Tensile elongation at break [%] | | | 180 | 120 | 90 | 50 | 95 | 115 | 15 | 150 | 70 | 12 | 15 |

TABLE 2

|  |  |  | Example | | | | | | | Comparative Example | | | |
|---|---|---|---|---|---|---|---|---|---|---|---|---|---|
|  |  |  | 12 | 13 | 14 | 15 | 16 | 17 | 18 | 1 | 2 | 3 | 4 |
| Biodegradable resin (A) | A-1 | parts by weight | 5 | 5 | 20 | 28 | 20 | 20 | 20 | 40 | 90 | | 25 |
| Polyolefin resin (B) | B-1 | parts by weight | 80 | 85 | 70 | 67 | | 70 | 70 | 50 | 5 | 100 | |
|  | B-2 | parts by weight | | | | | 70 | | | | | | 50 |
| Compatibilizing agent (C) | C-1-1 | parts by weight | | | | | | | | 5 | | | |
|  | C-1-2 | parts by weight | | | | | | | | | | | |
|  | C-2-1 | parts by weight | | | | | | | | | 5 | | |
|  | C-2-2 | parts by weight | | | | | | | | | | | |
|  | C-3-1 | parts by weight | | | | | | | | | | | |
|  | C-3-2 | parts by weight | | | | | | | | | | | |
|  | C-3-3 | parts by weight | | | | | | | | | | | |
|  | C-4-1 | parts by weight | | | | | | | | | | | |
|  | C-4-2 | parts by weight | | | | | | | | | | | |
|  | C-5-1 | parts by weight | 15 | 10 | 10 | 5 | | | | | | | |
|  | C-5-2 | parts by weight | | | | | 10 | | | | | | 25 |
|  | C-5-3 | parts by weight | | | | | | 10 | | | | | |
|  | C-5-4 | parts by weight | | | | | | | 10 | | | | |
| Average dispersed particle size of biodegradable resin (A) [nm] | | | 160 | 400 | 350 | 620 | 690 | 820 | 750 | 3500 | Sea | — | 1900 |
| Molding cycle time [sec] | | | 45 | 30 | 30 | 30 | 30 | 30 | 30 | 80 | 100 | 30 | 60 |
| Impact strength [J/m] | | | 55 | 50 | 50 | 42 | 35 | 48 | 50 | 25 | 25 | 25 | 78 |
| Heat resistance [° C.] | | | 90 | 108 | 110 | 120 | 92 | 98 | 90 | 65 | 52 | 102 | 70 |
| Tensile strength [MPa] | | | 30 | 35 | 32 | 30 | 28 | 30 | 29 | 38 | 70 | 35 | 50 |
| Tensile elongation at break [%] | | | 20 | 18 | 17 | 15 | 170 | 30 | 25 | 5 | 5 | 300 | 20 |

Examples 19 to 30 and Comparative Example 5 to 8

Raw materials as shown in Table 3 were mixed to prepare resin composition pellets according to the same method as that of Example 1. The obtained pellets were supplied into a single-screw extruder, and the molten resin composition was extruded from the die as a sheet at 230° C., wound around a drum with a temperature of 30° C., to be cooled and solidified, for obtaining a cast film. The cast film was stretched to 4 times in the machine direction using stretching rolls at a preheating temperature of 155° C. and a stretching temperature of 155° C., immediately cooled to room temperature, stretched to 8 times in the transverse direction using a tenter at a preheating temperature of 155° C. and a stretching temperature o 160° C., relaxed by 5% in the transverse direction while being heat-treated at a temperature of 160° C. for 10 seconds, for obtaining a biaxially oriented film. The evaluation results of the films obtained in the respective examples and comparative examples are shown in Table 3.

As shown in Table 3, it can be seen that the films formed of the resin compositions are excellent in film formability, dimensional stability and water vapor barrier property. Meanwhile, in Comparative Example 6, since the film could not be formed under the above-mentioned conditions, evaluations thereafter were not made.

TABLE 3

| | | | Example | | | | | | | | | | | | Comparative Example | | | |
|---|---|---|---|---|---|---|---|---|---|---|---|---|---|---|---|---|---|---|
| | | | 19 | 20 | 21 | 22 | 23 | 24 | 25 | 26 | 27 | 28 | 29 | 30 | 5 | 6 | 7 | 8 |
| Biodegradable resin (A) | A-1 | parts by weight | 5 | 25 | 25 | 5 | 20 | 5 | 20 | 28 | 5 | 20 | 20 | 15 | 40 | 90 | | 25 |
| Polyolefin resin (B) | B-3 | parts by weight | 90 | 65 | 60 | 90 | 70 | 85 | 70 | 67 | 80 | 70 | 70 | 75 | 50 | 5 | 100 | 50 |
| Compatibilizing agent (C) | C-1-1 | parts by weight | 5 | 10 | | | | | | | | | | | 5 | | | |
| | C-2-1 | parts by weight | | | 15 | | | | | | | | | | | | | |
| | C-3-3 | parts by weight | | | | 5 | 10 | | | | | | | | | | | |
| | C-5-1 | parts by weight | | | | | | 10 | 10 | 5 | 15 | | | | | | | |
| | C-5-2 | parts by weight | | | | | | | | | | 10 | | | | | | 25 |
| | C-5-3 | parts by weight | | | | | | | | | | | 10 | | | | | |
| | C-5-4 | parts by weight | | | | | | | | | | | | 10 | | | | |
| Average dispersed particle size of biodegradable resin (A) [nm] | | | 920 | 780 | 820 | 900 | 790 | 520 | | 570 | 120 | 630 | 900 | 850 | 4350 | Sea | — | 2000 |
| Film formability | | | A | A | A | A | A | A | A | A | A | A | A | A | B | C | A | B |
| Film thickness [μm] | | | 15.0 | 15.8 | 15.1 | 15.3 | 15.3 | 15 | 15.1 | 15.2 | 15 | 14.9 | 15.1 | 15 | 15 | — | 14.7 | 15.2 |
| Heat shrinkage percentage (machine direction/transverse direction) [%] | | | 1.5/ 0.7 | 2.3/ 0.9 | 1.8/ 0.3 | 1.9/ 1.8 | 2.4/ 1.3 | 1.8/ 0.6 | 1.0/ 0.2 | 0.3/ 0.3 | 1.3/ 0.8 | 1.1/ 0.5 | 2.1/ 0.6 | 2.0/ 0.9 | 4.0/ 0.1 | — | 3.5/ 0.8 | 5.0/ 2.0 |
| Water vapor permeability [g/m² · day] | | | 21 | 28 | 18 | 9 | 13 | 11 | 13 | 19 | 30 | 20 | 15 | 20 | 95 | — | 21 | 80 |

Examples 31 and 32 and Comparative Examples 9 and 10

Raw materials as shown in Table 4 were mixed to prepare resin composition pellets according to the same method as that of Example 1. The obtained pellets were supplied into a single-screw extruder and the molten resin composition was discharged from the pores of a spinneret at a spinneret temperature of 220° C. The spun resin composition was sucked by an ejector and spun at a spinning speed of 3500 m/min, and the fibers were collected on a traveling net conveyor for obtaining a web. The obtained web was thermally compressed between an embossing roll with a projection area of 15% and a flat roll at a temperature of 140° C. and a pressure of 50 kg/cm, to produce a spun-bond nonwoven fabric with a single fiber fineness of 1.5 decitexes and a unit-area weight of 20 g/m². The evaluation results of the obtained nonwoven fabric are shown in Table 4. As shown in Table 4, the fibers formed of the resin compositions are excellent in dimensional stability and moisture-proof property.

TABLE 4

| | | | Example | | Comparative Example | |
|---|---|---|---|---|---|---|
| | | | 31 | 32 | 9 | 10 |
| Biodegradable resin (A) | A-1 | parts by weight | 20 | 20 | 40 | 75 |
| Polyolefin resin (B) | B-3 | parts by weight | 70 | 70 | 50 | 15 |
| Compatibilizing agent (C) | C-3-1 | parts by weight | 10 | | 5 | 5 |
| | C-5-3 | parts by weight | | 10 | | |
| Average dispersed particle size of biodegradable resin (A) [nm] | | | 720 | 820 | 4050 | Sea |
| Spinnability | | | A | A | C | C |
| Single fiber fineness [dtex] | | | 1.5 | 1.8 | 1.7 | — |
| Tensile tenacity | | | Acceptable | Acceptable | Acceptable | — |
| Dry heat shrinkage percentage [%] | | | 5 | 6 | 11 | — |

INDUSTRIAL APPLICABILITY

The resin composition is excellent in moldability and can provide a molded article excellent in impact resistance, heat resistance, mechanical properties, moisture-proof property and the like. The resin composition can be suitably used as films for general industry and packaging materials, nonwoven fabrics for foods, sanitary materials, industrial materials and the like.

The invention claimed is:
1. A film comprising a resin composition comprising a polylactic acid biodegradable resin (A), a polyolefin resin (B)

and a dispersing agent (C), which has a sea-isle structure in which the biodegradable resin (A) is dispersed as isles in the polyolefin resin (B) existing as a sea component, wherein 1) the average dispersed particle size of the biodegradable resin (A) is 120 nm to 690 nm, the dispersing agent (C) is polyolefin-polystyrene block copolymers containing acid anhydride group, and the ration (B) is 0.05 to 0.42, and 2) the heat shrinkage rate of the film is 1.8% or less in the machine direction and is 0.6% or less in the transverse direction at a temperature of 120° C. based on JIS Z 1712.

2. The film according to claim 1, wherein when the total weight of the biodegradable resin (A), the polyolefin resin (B) and the dispersing agent (C) is 100 mass %:
   (1) the content (a) of the biodegradable resin (A) is in a range from 4 to 30 mass %;
   (2) the content (b) of the polyolefin resin (B) is in a range from 56 to 95 mass %; and
   (3) the content (c) of the dispersing agent (C) is in a range from 0.1 to 20 mass %.

3. The film according to claim 1, wherein the polyolefin resin (B) contains at least one polymer selected from the group consisting of polypropylene resin, polyethylene resin and ethylene-propylene co-polymer resin.

4. The film according to claim 1, having a water vapor permeability in a range of 11 to 30 g/m2 per day in an environment of 40° C. and 90% RH.

5. The film according to claim 1, which is a packaging film.

* * * * *

UNITED STATES PATENT AND TRADEMARK OFFICE
CERTIFICATE OF CORRECTION

Page 1 of 1

PATENT NO.        : 8,709,591 B2
APPLICATION NO.   : 12/513930
DATED             : April 29, 2014
INVENTOR(S)       : Sumi et al.

It is certified that error appears in the above-identified patent and that said Letters Patent is hereby corrected as shown below:

In the Claims,

In Column 29

At line 7, please delete "ration" and insert -- ratio by mass (a/b) of content (a) of the biodegradable resin (A) to content (b) of the polyolefin resin --.

Signed and Sealed this
Twenty-fourth Day of February, 2015

Michelle K. Lee
*Deputy Director of the United States Patent and Trademark Office*